(12) United States Patent
Uchikawa et al.

(10) Patent No.: US 6,328,656 B1
(45) Date of Patent: Dec. 11, 2001

(54) PROPELLER SHAFT FOR AUTOMOBILE

(75) Inventors: Koichi Uchikawa; Hidehisa Tomizawa, both of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/537,045

(22) Filed: Mar. 28, 2000

(30) Foreign Application Priority Data

Mar. 30, 1999 (JP) .................................................. 11-088624

(51) Int. Cl.$^7$ ....................................................... F16C 3/02
(52) U.S. Cl. .............................................. 464/183; 464/79
(58) Field of Search ........................... 464/79, 179, 183; 280/777; 180/232; 188/371, 377; 138/121

(56) References Cited

U.S. PATENT DOCUMENTS

| | | | |
|---|---|---|---|
| 3,487,710 | * | 1/1970 | Fergle ............................... 188/371 X |
| 3,754,411 | * | 8/1973 | Orain .................................... 464/179 |
| 4,304,147 | * | 12/1981 | Linnemeier et al. ............ 188/371 X |
| 4,512,209 | * | 4/1985 | Linnemeier ............................. 74/492 |
| 4,531,619 | * | 7/1985 | Eckels .................................. 188/371 |
| 5,503,431 | * | 4/1996 | Yamamoto ........................... 280/777 |
| 6,189,919 | * | 2/2001 | Sinnhuber et al. .............. 280/777 X |

FOREIGN PATENT DOCUMENTS 5178105   7/1993   (JP) .
8226454   9/1996   (JP) .

OTHER PUBLICATIONS

List of Unpatentable Examples of Automobile Technologies No. 95202, Mar. 31, 1995, Published by the Committee of Intelectual Properties of Japan Automobile Manufacturers Association.

* cited by examiner

Primary Examiner—Lynne H. Browne
Assistant Examiner—Greg Binda
(74) Attorney, Agent, or Firm—Martin A. Farber

(57) ABSTRACT

A vehicular propeller shaft having a hollow shaft, a bellows section integrally connected with said hollow pipe and a universal joint, the bellows section comprises a small diameter section, a large diameter section whose diameter is larger than the small diameter section, a plurality of swelling sections partially, outwardly swelled, having an enlarged diameter and a trapezoid cross section, annularly shaped around the hollow pipe, and consecutively disposed between said small diameter section and said large diameter section and a valley section having a reduced diameter, annularly shaped and disposed between two adjacent swelling sections.

7 Claims, 9 Drawing Sheets

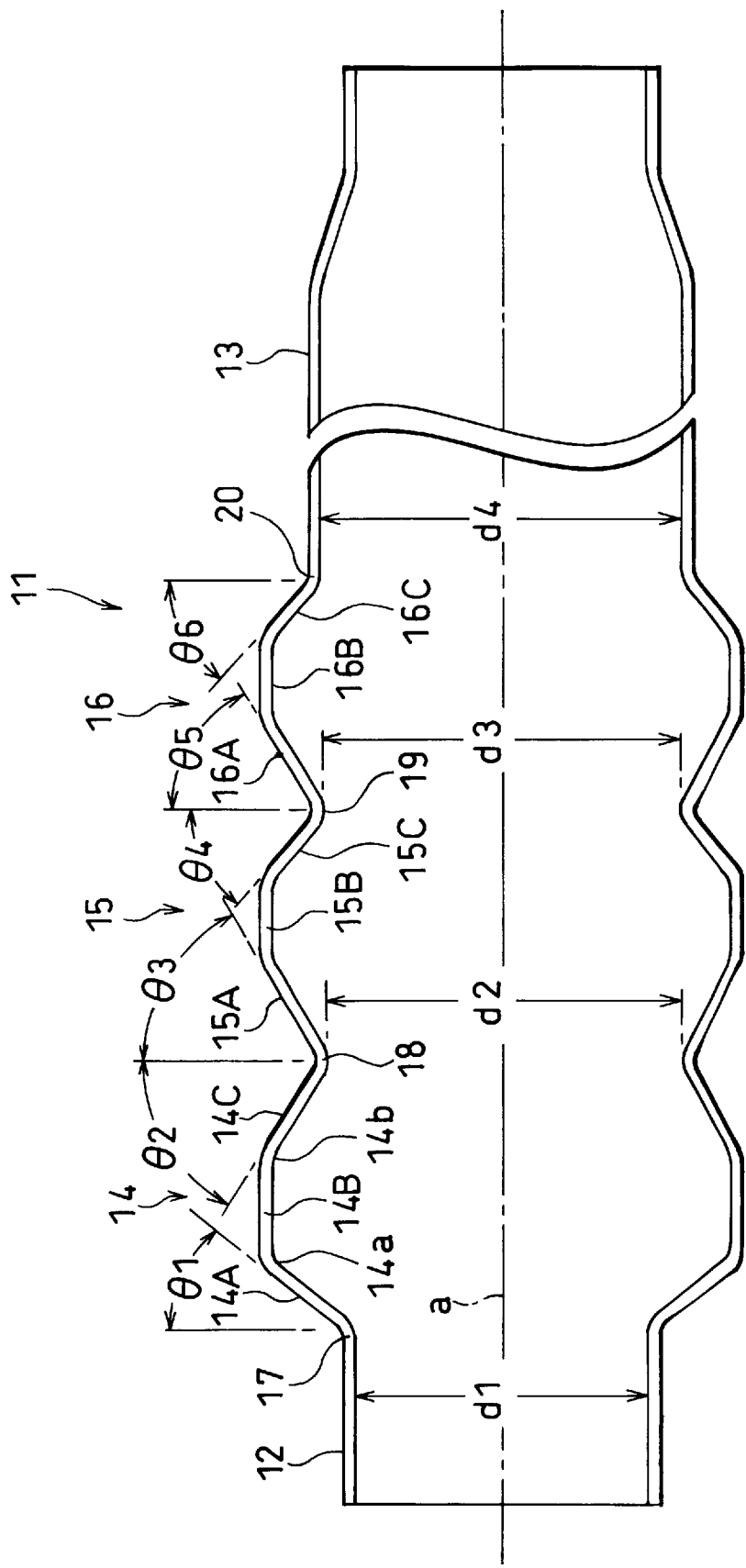

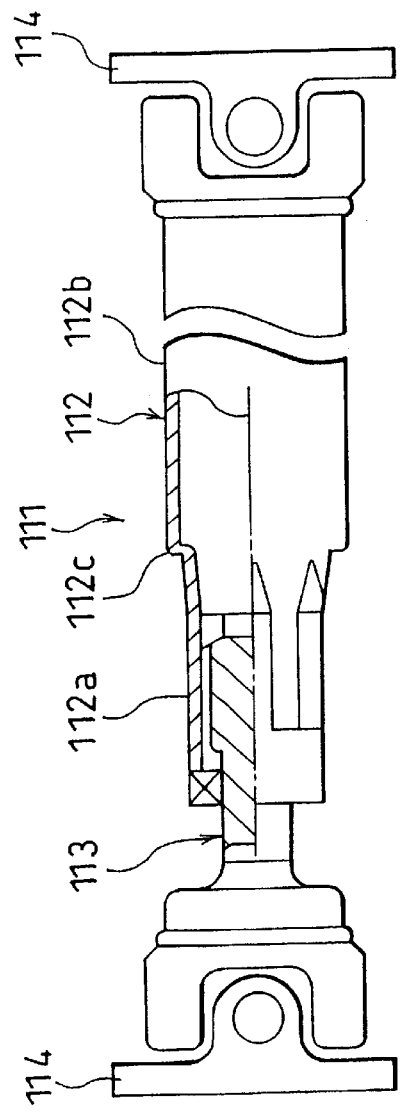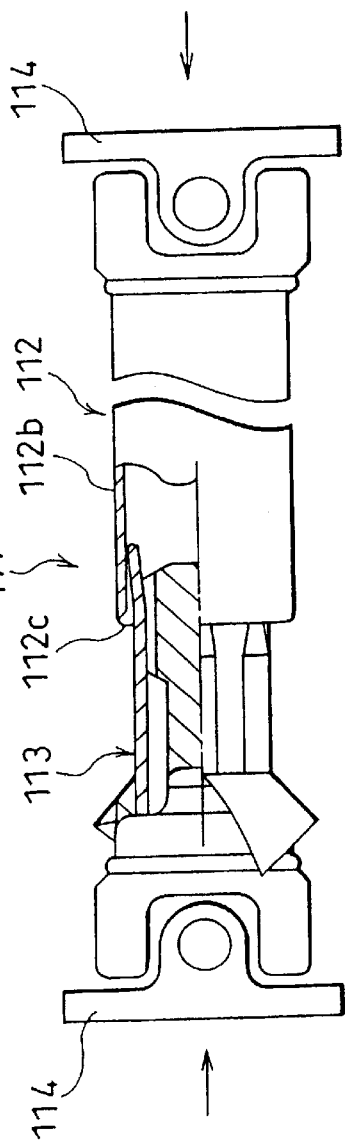
FIG.9a PRIOR ART
FIG.9b PRIOR ART

PROPELLER SHAFT FOR AUTOMOBILE

BACKGROUND OF THE INVENTION

1. Field of the Invention

The present invention relates to a propeller shaft for a vehicle, more particularly, to a vehicular propeller shaft capable of absorbing an impact by being deformed axially when an impact load is applied in the longitudinal direction of the vehicle.

2. Prior Art

Generally, a vehicle is constituted so as to transmit engine power from a transmission to a differential through a propeller shaft and from the differential to wheels.

However, the propeller shaft is disposed in the transversal center of the vehicle in the longitudinal direction thereof and therefore, for example, in an event of collision, when a large impact is exerted in the lengthwise direction of the vehicle, the deformation of the vehicle body is blocked by a "lengthwise resistance" of the propeller shaft and as a result a still larger impact is caused in the vehicle.

In order to solve this problem, Japanese Patent Application Laid-open No. Toku-Kai-Hei 5-178105 discloses a technique in which a propeller shaft is shaped into a hollow pipe to raise a torsional rigidity per weight. Also, the propeller shaft has a swelling portion annually formed in the radial direction thereof. When an excessively large impact load is applied to the vehicle, the swelling portion is deformed so that the propeller shaft is released from a state of lengthwise resistance.

As shown in FIG. 8, List of Unpatentable Examples of Automobile Technologies No. 95202 published by the Committee of Intellectual Properties of Japan Automobile Manufactures Association, discloses a propeller shaft 100 comprising a hollow propeller shaft 101, a center support bearing 102 provided at the rear end of the propeller shaft 100 and a bellows pipe 103 connected in the front thereof with the hollow propeller shaft 101 and connected in the rear thereof with the center support bearing 102. When an axial load is applied to the propeller shaft 100, the bellows pipe 103 is deformed so that the propeller shaft 100 can be released from the state of lengthwise resistance.

Further, FIG. 9a shows a propeller shaft 111 disclosed by Japanese Patent Application Laid-open No. Toku-Kai-Hei 8-226454. The propeller shaft 111 comprises a female member 112 and a male member 113 spline-fitted to the female member 112. The female member 112 comprises a small diameter portion 112a and a large diameter portion 112b and the small diameter portion 112a is spline-fitted over the male member 113. Therefore, a step portion 112c is formed on the propeller shaft 111 between the small diameter portion 112a and the large diameter portion 112b.

When an impact load is applied to thus formed propeller shaft 111 in the longitudinal direction, as shown in FIG. 9b, the step portion 112c is deformed or broken in the axial direction so as to absorb the impact load.

According to the propeller shaft disclosed in the Patent Application No. Toku-Kai-Hei 5-178105, when a large impact load is applied in the longitudinal direction, first the swelling portion must be deformed in the axial direction. However, the deformation of the swelling portion needs a large initial load and therefore the impact can not be absorbed in a proper and effective way. Further, there occurs so called "collision phenomenon" in which both ends of the swelling portion abut against each other and as a result the propeller shaft can not have an adequate crash stroke. On the other hand, the formation of a plurality of swelling portions leads to a fear of reduced critical speed of the propeller shaft.

In case of the propeller shaft 100 disclosed in List of Unpatentable Examples of Automobile Technologies No. 95202, when an axial load is exerted on the hollow propeller shaft 101, the bellows pipe 103 is deformed to reduce the lengthwise resistance of the propeller shaft 100.

However, when the propeller shaft 100 is deformed and shortened, respective tops of the bellows pipe 103 abut against neighboring tops and respective valleys thereof abut against neighboring valleys, that is, "collision phenomenon" is generated. This prevents the propeller shaft 100 from having an adequate crash stroke. On the other hand, an increased number of tops and valleys of the bellow pipe 103 has an adverse effect on the critical speed of the propeller shaft 100.

According to the propeller shaft 111 disclosed in Toku-Kai-Hei 8-226454, the problem is that since the deformation or breakage in the axial direction requires a large impact load, especially, a large impact load at the initial stage, the propeller shaft 111 still has a difficulty in alleviating the impact effectively.

SUMMARY OF THE INVENTION

It is an object of the present invention to provide a vehicular propeller shaft having an adequate crash stroke without decreasing critical speed thereof, this preventing the propeller shaft from having a lengthwise resistance, thereby an effective alleviation of impact can be achieved.

To attain the object, the propeller shaft has a hollow pipe and a bellows section which comprises a small diameter section, a large diameter section whose diameter is larger than the small diameter section, a plurality of swelling sections partially, outwardly swelled, having an enlarged diameter, annularly shaped around the hollow pipe, and consecutively disposed between the small diameter section and the large diameter section and a valley section having a reduced diameter, annularly shaped and disposed between two adjacent swelling sections. The swelling section has a trapezoid cross section constituted by an up-grade surface, a down-grade surface and a top surface provided between said up-grade surface and said down-grade surface.

BRIEF DESCRIPTION OF DRAWINGS

FIG. 3 is a partially expanded view of a portion "A" of FIG. 2;

FIGS. 9a and 9b are partially cross sectional views of a propeller shaft according to prior art.

DESCRIPTION OF PREFERRED EMBODIMENTS

Figure 1:
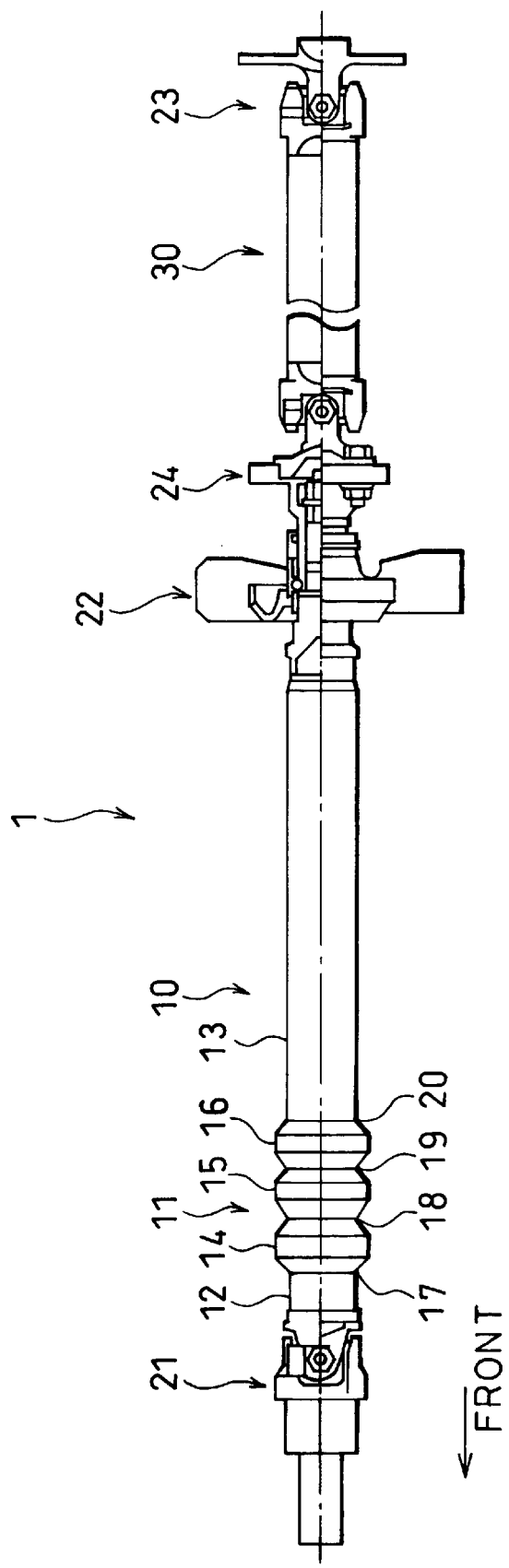
FIG. 1 is a cross sectional view showing a propeller shaft according to a first embodiment of the present invention.

Referring now to FIG. 1, a propeller shaft 1 comprises a first propeller shaft 10 which is connected at the front end thereof with a main shaft (not shown) of a transmission (not shown) via a universal joint 21 and which is rotatably supported at the rear end thereof by a center bearing 22 and a second propeller shaft 30 which is connected at the front end thereof with the first propeller shaft 10 via a universal joint 24 and which connected at the rear end thereof with a rear differential (not shown) via a universal joint 23.

Figure 2:
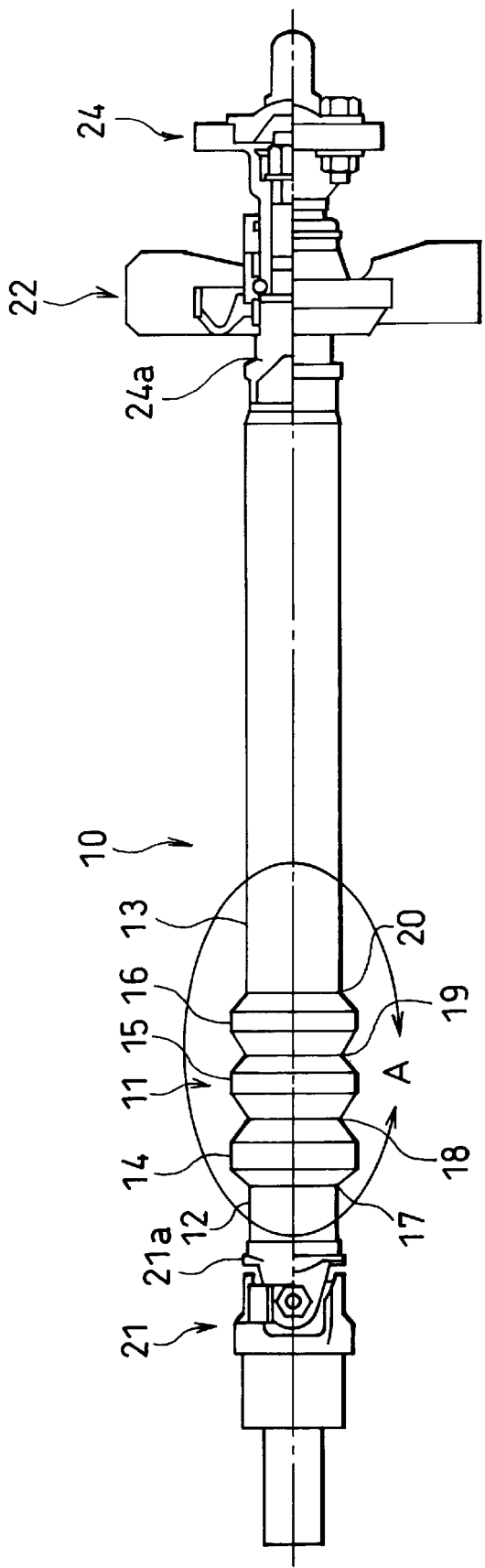
FIG. 2 is a partially expanded view of a propeller shaft of FIG. 1.

The first propeller shaft 10 is shaped into a hollow configuration to enhance the rigidity per weight, as shown in FIG. 2. The first propeller shaft 10 is connected at the front end thereof with a joint yoke 21a and connected at the rear end thereof with a spline shaft 24a of the universal joint 24 which is rotatably supported by the center bearing 22.

A bellows section 11 is formed near the front end of the first propeller shaft 10. As an enlarged sectional view of the portion "A" in FIG. 2 is shown in FIG. 3, the portion "A" is integrally connected on the front side thereof with a small diameter section 12 and is integrally connected on the rear side thereof with a large diameter section 13. Three consecutive swelling sections 14, 15 and 16 have a trapezoid cross section respectively and are annularly provided between the small diameter section 12 and the large diameter section 13 of the bellows section 11. A first swelling section 14 has a trapezoid cross section constituted by an annular first up-grade surface 14A, an annular first top surface 14B and an annular first down-grade 14C, a second swelling section 15 has a trapezoid cross section constituted by an annular second up-grade surface 15A, an annular second top surface 15B and an annular second down-grade surface 15C, and a third swelling section 16 has a trapezoid cross section constituted by an annular third up-grade surface 16A, an annular third top surface 16B and an annular third down-grade surface 16C.

The first swelling section 14 is integrally connected at the front end thereof with the small diameter section 12 via a first bend portion 17, the second swelling section 15 is integrally connected at the front end thereof with the rear end of the first swelling section 14 via a valley portion 18, the third swelling section 16 is integrally connected at the front end thereof with the rear end of the second swelling section 15 and it is integrally connected at the rear end thereof with the large diameter section 13 via a second bend portion 20.

Diameters d1, d2, d3 and d4 of the small diameter section 12, the first valley 18, the second valley 19 and the large diameter section 20, respectively are established to be d1<d2<d3<d4.

Further, when θ1 represents an angle at which the first up-grade surface 14A meets a plane perpendicular to an axis a of the first propeller shaft 10, θ2 an angle at which the first down-grade surface 14C meets that plane, θ3 an angle at which the second up-grade surface 15A meets the plane, θ4 an angle at which the second down-grade surface 15C meets that plane, θ5 an angle at which the third up-grade surface 16A meets the plane and θ6 an angle at which the third down-grade surface 16C meets the plane, these angles are established to be θ1<θ2, θ3>θ4 and θ5>θ6.

Figure 4A:
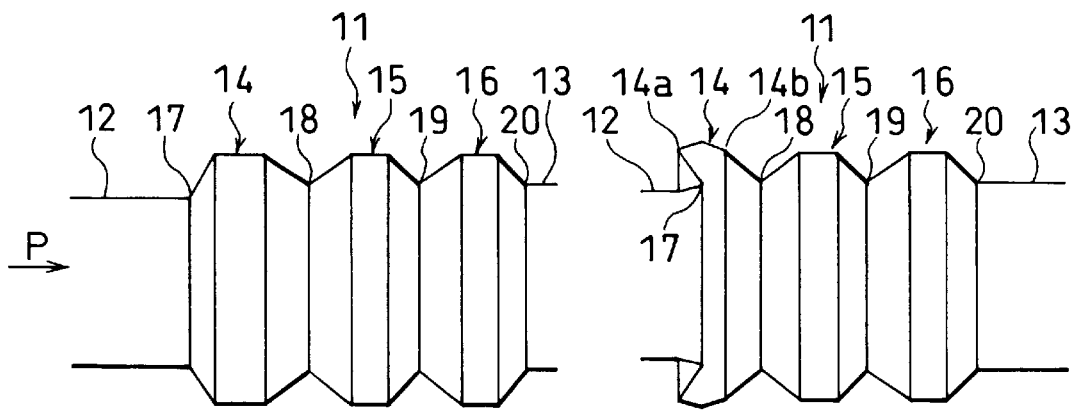
FIGS. 4a through 4e are explanatory views showing processes of deformation of a bellows section.
Figure 4B:
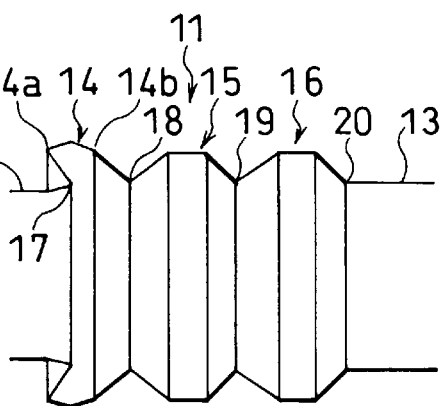
Figure 4C:
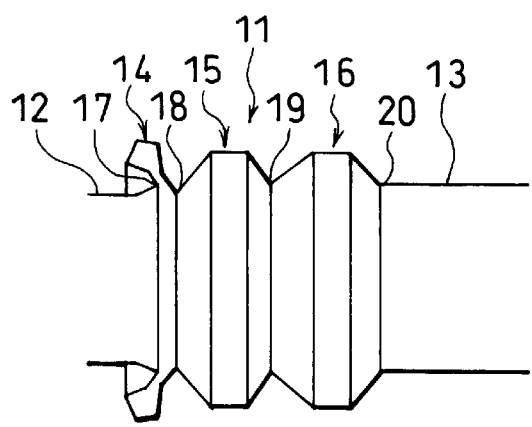

Next, FIGS. 4a through 4e show deformation modes of the bellows section 11 of thus formed propeller shaft 1, when an impact load P larger than a certain value is applied to the propeller shaft 1 in the lengthwise direction. Starting with an initial mode (not yet deformed) of the bellows section shown in FIG. 4a, FIGS. 4b, 4c, 4d and 4e show changes of deformation mode in this order, respectively. Further, FIG. 5 is a graph showing a relationship between load and displacement and symbols b, c, d and e correspond to modes of deformation of the propeller shaft 1 in FIGS. 4b, 4c, 4d and 4e respectively.

When the impact load P which is larger than a certain value is applied to the propeller shaft 1, stress is concentrated on the first bend 17 between the small diameter section 12 and the first up-grade surface 14A and also concentrated on the first corner 14a between the first up-grade surface 14A and the first top surface 14B. As a result of this, as shown in FIG. 4b, these stress-concentrated portions absorb the impact energy and the bellows section 11 is reduced in the lengthwise size.

Accompanied by the size reduction of the bellows section 11, the bend portion 17 comes close to the first valley portion 18. Then, the top surface 14B is deformed and at the same time the second corner 14b bends. As shown in FIG. 4c, since the inclination θ1 of the first up-grade surface 14A is smaller than the inclination θ2, the first up-grade surface 14A submerges under the first top surface 14B and the first up-grade surface 14A and the first top surface 14B are crushed toward the first down-grade surface 14C in such a way that the first bend portion 17 abuts against the first valley portion 18. Thus, during this deformation process of the first swelling section 14, the impact energy up to the portion "c" of FIG. 5 is absorbed.

Figure 4D:
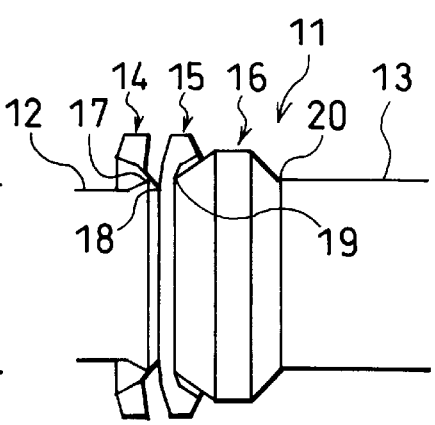
Figure 5:
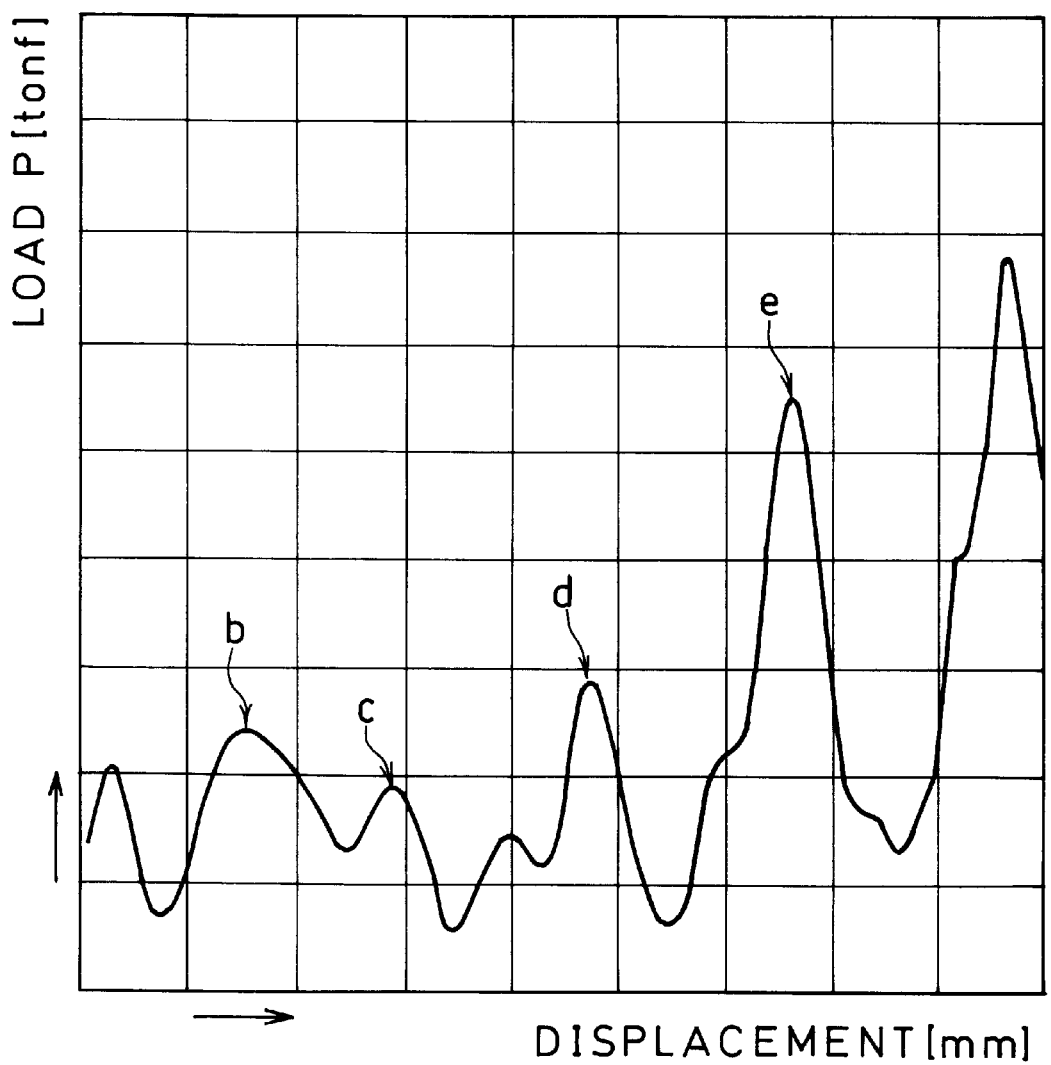
FIG. 5 is a diagram showing a relationship between a displacement and a load when a bellows section is deformed by the load.

Next, since the diameter d2 of the first valley portion 18 is formed so as to be larger than the diameter d1 of the small diameter section 12 and smaller than the diameter d4 of the large diameter section 13 and the inclination angle θ3 of the second up-grade surface 15A is larger than the inclination angle θ4 of the second down-grade surface 15C, the second top surface 15B and the second valley portion 19 are mainly bent and the second swelling section 15, as shown in FIG. 4d, is crashed in such a way that the second up-grade surface 15A comes close to the second down-grade surface 15C. Thus, the impact energy up to the portion "d" of FIG. 5 is absorbed.

Figure 4E:
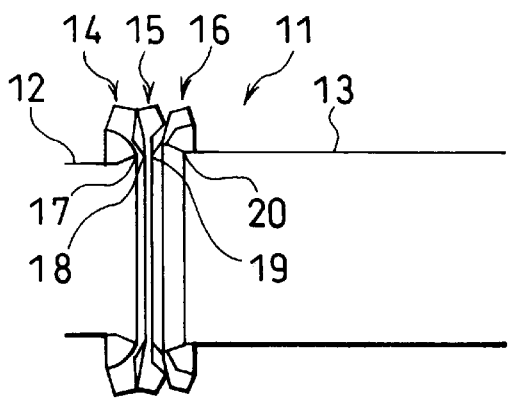

Further, since the large diameter section 13 is relatively large and the inclination angle θ5 of the third up-grade surface 16A is larger than the inclination angle θ6 of the third down-grade surface 16C, the third top surface 16B and the second bend portion 20 are mainly bent due to the concentration of stress, the third swelling section 16 is crushed, as shown in FIG. 4e, such that the third up-grade surface 16A covers the third down-grade surface 16C from above, thus the bellows section 11 is deformed and the impact energy up to the portion "e" of FIG. 5 is absorbed.

According to the propeller shaft 1 having thus formed bellows section 11, since the diameter d1 of the small diameter section 12 is established to be smaller than the diameter d2 of the first valley portion 18 and the inclination angle θ1 of the first up-grade surface 14A is established to be smaller than the inclination angle θ2 of the first down-grade surface 14C, when the impact load is applied to the bellows section 11 in the axial direction, the bend portion 17 submerges under the first valley portion 18. At this moment, when the impact load is furthermore applied to the bellows section 11, the bend portion 17 slides under the first valley portion 18 and it never abuts against the first valley portion 18. Thus, at the initial stage of impact, the bellows section 11 is easily deformed with a small impact load. Further, since the diameter d2 of the first valley section 18 is established to be equal to or smaller than the diameter d3 of the second valley section 19 and the inclination θ3 of the second up-grade surface 15A is established to be larger than the inclination θ4 of the second down-grade surface 15C, the second swelling section 15 is crashed such that the second up-grade surface 15 comes close to the second down-grade surface 15C, the impact energy is absorbed. Further, since the diameter d3 of the second valley portion 19 is established to be smaller than the diameter d4 of the large diameter section 13 and the inclination angle θ5 of the third up-grade surface 16A is established to be larger than the inclination angle θ6 of the third down-grade surface 16C, when the impact load is applied to the bellows section 11 in the axial direction, the second valley portion 19 submerges under the second bend portion 20. At this moment, when the impact load is furthermore applied to the bellows section 11, the second valley portion 19 slides under the second bend portion 20 and it never abuts against the second bend portion 20. Thus, since the first bend portion 17, the first valley portion 18, the second valley portion 19 and the second bend portion 20 are deformed respectively in such a way that the first bend portion 17 and the second bend portion 20 submerge under the bellows section 11 without abutting between these portions 17, 18, 19 and 20. As a result, the propeller shaft 1 secures an adequate crush stroke and can be relieved from lengthwise resistance of the propeller shaft.

Further, since the bellows section 11 is constituted by small numbers of swelling sections, the first swelling section 14, the second swelling section 15 and the third swelling section 16, the vehicle safety can be secured without reducing critical speed of the propeller shaft.

Further, since the bellows section 11 is formed only at the front portion of the first propeller shaft 1, the components after the center bearing 22 can be used as they are in the prior art.

Next, a propeller shaft according to a second embodiment of the present invention will be described by reference to FIGS. 6 and 7. The components of the propeller shaft which are identical in both embodiments are denoted by identical reference numbers and are not described in detail.

Figure 6:
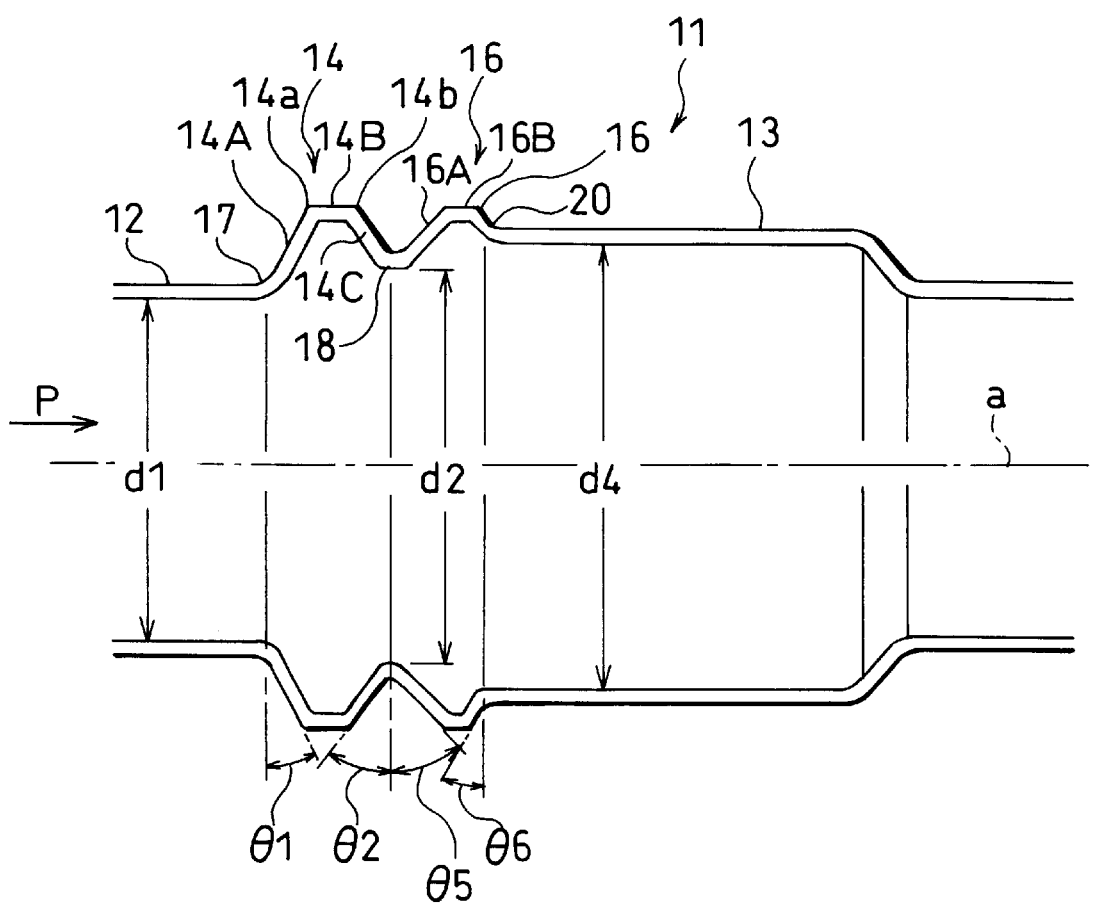
FIG. 6 is a cross sectional view showing a bellows section according to a second embodiment.
Figure 7:
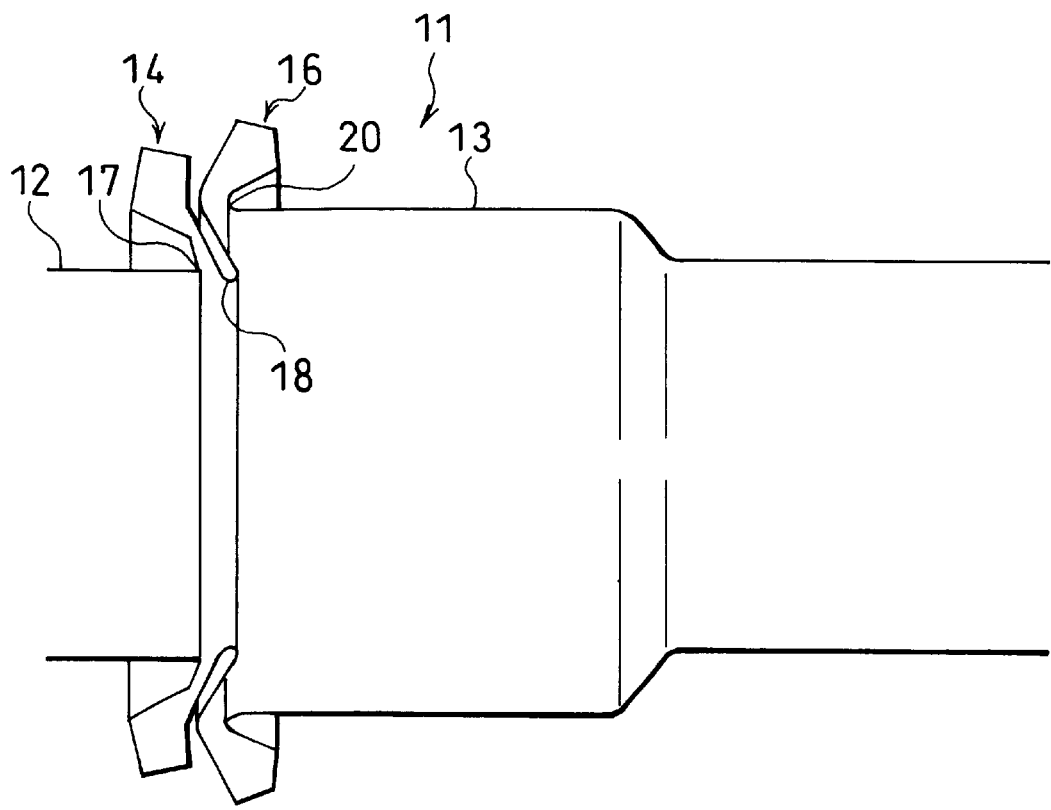
FIG. 7 is a cross sectional view showing a mode of deformation of a bellows section of FIG. 6.
Figure 8:
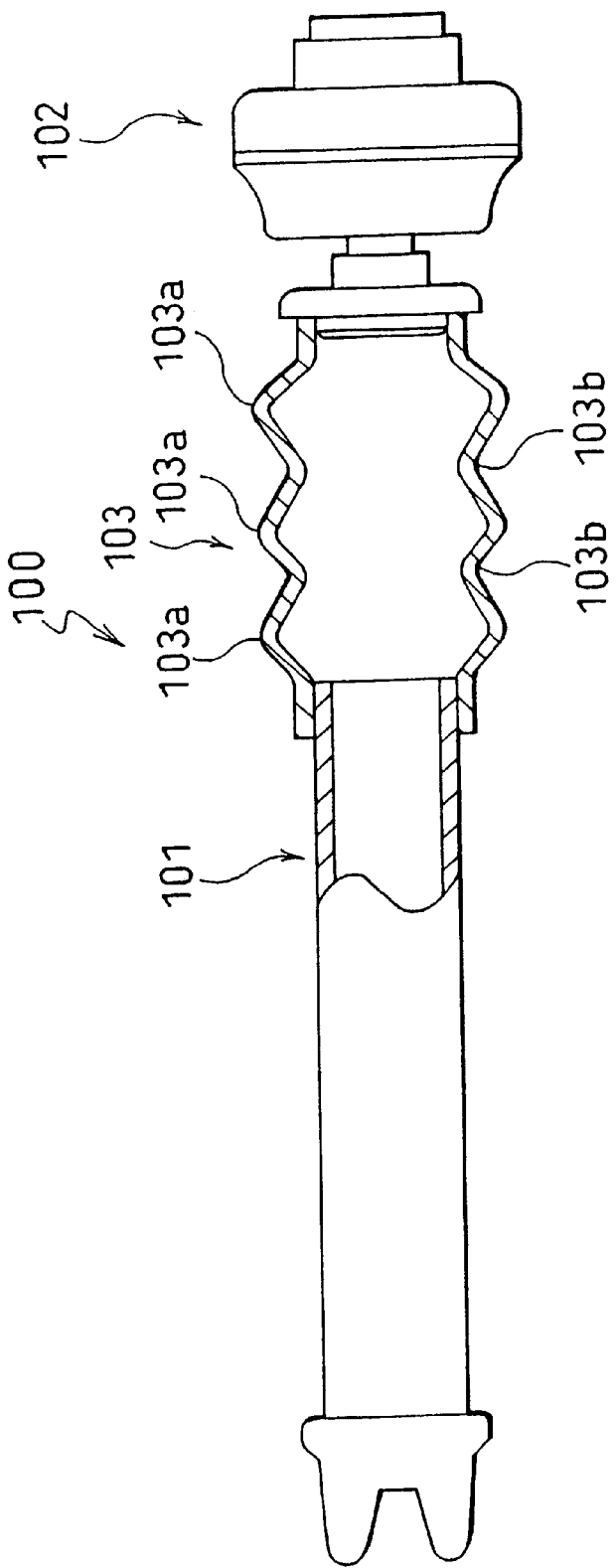
FIG. 8 is a schematic cross sectional view of a propeller shaft according to prior art.

FIG. 6 is an enlarged sectional view of a bellows section 11 which corresponds to FIG. 3 according to the first embodiment. In the second embodiment, the second swelling section 15 is deleted from the bellows section 11 of the first embodiment. The bellows section 11 has a small diameter section 12 and a large diameter section 13, and a first swelling section 14 and a third swelling section 16 are annularly formed consecutively between the small diameter section 12 and the large diameter section 13 of the bellows section 11.

These small diameter section 12, first swelling section 14, third swelling section 16 and large diameter section 13 are formed consecutively via a first bend portion 17, a first valley portion 18 and a second bend portion 20. Here, reference numerals d1, d2 and d4 denote the diameters of the small diameter section 12, the first valley portion 18 and the large diameter section 13, respectively and the diameters d1, d2 and d4 are established so as to be d1<d2<d4.

Further, reference numerals θ1, θ2, θ5 and θ6 denote angles at which a plane perpendicular to the axis a of the propeller shaft 10 meets a first up-grade surface 14A, a first down-grade surface 14C, a third up-grade surface 16A and a third down-grade surface 16C, respectively and these angles are established to be θ1<θ2 and θ5>θ6.

Next, in thus formed propeller shaft 1, an operation of the propeller shaft, when a longitudinal impact load larger than a certain value is applied, will be described by reference to FIGS. 6 and 7.

When an impact load P which is larger than a certain value is applied to the propeller shaft 1, stress is concentrated on a first bend portion 17 where the small diameter section 12 turns abruptly to the first up-grade surface 14A and on a first corner 14a where the first up-grade surface 14A turns abruptly to the top surface 14B. As a result, the first bend portion 17 and the first corner 14a are deformed to absorb impact energy and the bellows section 11 is reduced in size.

Accompanied by the reduction of the bellows section 11, the first bend portion 17 comes close to the first valley portion 18 and a second corner 14b where the first top surface 14B turns to the first down-grade surface 14C is bent outwardly. Further, since the inclination angle θ1 of the first up-grade surface 14A is established to be smaller than the inclination angle θ2 of the first down-grade surface 14C, the first up-grade surface 14A slidably submerges under the first down-grade 14C, while the first bend portion 17 and the first valley portion 18 are crushed. Thus, impact energy is absorbed by the size reduction of the bellows section 11.

Next, the first valley portion 18 whose diameter is formed so as to be larger than the small diameter section 12 and smaller than the large diameter section 13, is deformed and the third up-grade surface 16A is crushed by the up-coming first down-grade surface 14C to absorb impact energy.

As a result of this, stress is concentrated on a second bend portion 20 where the third down-grade surface 16C turns to the large diameter section 13 and the second bend portion 20 and the third top surface 16B are mainly deformed. Thus, the third swelling section 16 is crushed and the first bend portion 17 and the first valley portion 18 submerge under the large diameter section 13, as shown in FIG. 7. Thus, impact energy is absorbed by the size reduction of the bellows section 11.

According to the propeller shaft 1 having thus constituted bellows section 11, since the diameters d1, d2, d4 of the small diameter section 12, the first valley portion 18 and the large diameter section 13 respectively are established to be d1<d2<d4, in the same manner as the first embodiment, the first bend portion 17 which is formed at the end of the small diameter section 12 having a small diameter, the first valley portion 18 and the second bend portion 20, are deformed in this order. Further, since the inclination angles θ1, θ2 of the first up-grade surface 14A and the first down-grade surface 14C respectively are established to be θ1<θ2 and the inclination angles θ5, θ6 of the third up-grade surface 16A and the third down-grade surface 16C respectively are established to be θ5>θ6, the time difference is generated between the first swelling section 14 and the second swelling section 16 when these sections are deformed. Accordingly, the bellows section 11 can be deformed with a relatively small impact load and the initial load is properly controlled to alleviate impact effectively. Further, since the first bend portion 17 and the first valley portion 18 submerge under the large diameter section 13, while they are deformed, without collisions between the first bend portion 17, the first valley portion 18 and the second bend portion 20, an adequate crash stroke can be secured and the lengthwise resistance of the propeller shaft 11 can be avoided when an impact is applied thereto.

Further, due to still smaller number of the swelling sections than the first embodiment, the reduction of the critical speed can be avoided more surely.

In this embodiment, the bellows section 11 is formed at the front portion of the first propeller shaft 10, however, it is possible to dispose the bellows section 11 in the vicinity of the rear portion of the first propeller shaft 10. Further, the number of swelling sections is not limited to two or three and it is possible to increase the number of swelling sections of the bellows section within an allowable range of the reduction in critical speed of the propeller shaft 11.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A vehicular propeller shaft for transmitting power from a transmission to a differential having a hollow pipe, a bellows section integrally provided in said hollow pipe, said bellows section comprising:

a small diameter section;

a large diameter section having a larger diameter than that of said small diameter section;

a plurality of swelling sections outwardly swelling and consecutively disposed between said small diameter section and said large diameter section; and a valley section having a reduced diameter, and disposed between two adjacent swelling sections;

wherein said reduced diameter of said valley section is larger than that of said small diameter section and smaller than that of said large diameter section d to be smaller as it is closer to said small diameter section.

2. The propeller shaft according to claim 1, wherein each of said swelling sections has a trapezoid cross section constituted by an up-grade surface, a down-grade surface and a top surface provided between said up-grade surface and said down-grade surface.

3. The propeller shaft according to claim 2, wherein one of said swelling sections adjacent to said small diameter section includes a first up-grade surface and a first down-grade surface and an angle at which said first up-grade surface meets a plane perpendicular to an axis of said propeller shaft is smaller than an angle at which said first down-grade surface meets said plane.

4. The propeller shaft according to claim 2, wherein one of said swelling sections adjacent to said large diameter section includes a second up-grade surface and a second down-grade surface and an angle at which said second up-grade surface meets a plane perpendicular to an axis of said propeller shaft is larger than an angle at which said second down-grade surface meets said plane.

5. A propeller shaft for a vehicle, comprising:

a bellows portion formed at a predetermined portion of an entire length of said propeller shaft, said bellows portion including:

a small diameter section formed at one end of said bellows portion;

a large diameter section formed at the other end of said bellows portion with a larger diameter than that of said small diameter portion; and a plurality of swelling sections protruded outwardly between said small diameter section and said large diameter section, each of said swelling sections having a trapezoid cross section constituted by an up-grade surface, a down-grade surface and a top surface provided between said up-grade surface and said down-grade surface, wherein an angle at which said up-grade surface meets a plane perpendicular to an axis of said propeller shaft and an angle at which said down-grade surface meets said plane are provided differently.

6. A vehicular propeller shaft for transmitting power from a transmission to a differential having a hollow pipe, a bellows section integrally provided in said hollow pipe, said bellows section comprising:

a small diameter section;

a large diameter section having a larger diameter than that of said small diameter section;

a plurality of swelling sections outwardly swelling and consecutively disposed between said small diameter section and said large diameter section; and a valley section having a reduced diameter, and disposed between two adjacent swelling sections;

wherein each of said swelling sections has a trapezoid cross section constituted by an up-grade surface, a down-grade surface and a top surface provided between said up-grade surface and said down-grade surface;

wherein one of said swelling sections adjacent to said small diameter section includes a first up-grade surface and a first down-grade surface and an angle at which said first up-grade surface meets a plane perpendicular to an axis of said propeller shaft is smaller than an angle at which said first down-grade surface meets said plane.

7. A vehicular propeller shaft for transmitting power from a transmission to a differential having a hollow pipe, a bellows section integrally provided in said hollow pipe, said bellows section comprising:

a small diameter section;

a large diameter section having a larger diameter than that of said small diameter section;

a plurality of swelling sections outwardly swelling and consecutively disposed between said small diameter section and said large diameter section; and a valley section having a reduced diameter, and disposed between two adjacent swelling sections;

wherein each of said swelling sections has a trapezoid cross section constituted by an up-grade surface, a down-grade surface and a top surface provided between said up-grade surface and said down-grade surface;

wherein one of said swelling sections adjacent to said large diameter section includes a second up-grade surface and a second down-grade surface and an angle at which said second up-grade surface meets a plane perpendicular to an axis of said propeller shaft is larger than an angle at which said second down-grade surface meets said plane.

* * * * *